(12) United States Patent
Bruford et al.

(10) Patent No.: US 6,874,837 B2
(45) Date of Patent: Apr. 5, 2005

(54) LIFT ASSISTED TAILGATE SYSTEM FOR AUTOMOTIVE VEHICLE

(75) Inventors: Steve L. Bruford, West Bloomfield, MI (US); Duane A. Koehler, Livonia, MI (US); Ed Rybarczyk, Lakeview, NY (US); Scott G. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/710,104

(22) Filed: Jun. 18, 2004

(65) Prior Publication Data

US 2004/0262938 A1 Dec. 30, 2004

Related U.S. Application Data

(63) Continuation-in-part of application No. 10/604,331, filed on Jul. 11, 2003, now Pat. No. 6,793,623, which is a continuation-in-part of application No. 10/604,075, filed on Jun. 25, 2003, now Pat. No. 6,769,729.

(51) Int. Cl.$^7$ .............................. B62D 33/023
(52) U.S. Cl. .................. 296/50; 296/57.1; 296/146.11; 49/386; 16/308
(58) Field of Search ........................... 296/50, 57.1, 60, 296/146.1, 146.8, 146.11; 49/386; 16/308

(56) References Cited

U.S. PATENT DOCUMENTS

| | | |
|---|---|---|
| 2,984,517 A | 5/1961 | Farrow et al. |
| 3,031,225 A | 4/1962 | Saffer et al. |
| 3,166,783 A | 1/1965 | Mackie et al. |
| 3,336,070 A | 8/1967 | Jackson |
| 4,143,904 A | 3/1979 | Cooper et al. |
| 5,358,301 A | 10/1994 | Konchan et al. |
| 5,988,724 A | 11/1999 | Wolda |
| 6,637,796 B1 | 10/2003 | Westerdale et al. |

*Primary Examiner*—Patricia L. Engle
(74) *Attorney, Agent, or Firm*—Gigette M. Bejin

(57) ABSTRACT

An automotive vehicle has a door adapted to pivot about a generally horizontal pivot axis, with the door including a shell defining a space surrounded by the shell. The door is pivoted upon bearings located at each end of the door. A full floating torsion bar is provided and includes a first end rotationally grounded to the door shell and a second end engaged with and rotationally locked with a bearing inserts so that the torsion bar will be subjected to torsional loading as the door is pivoted. At least a portion of the torsion bar extends along an external recess defined by the door's inner and outer panels.

22 Claims, 6 Drawing Sheets

Figure 3
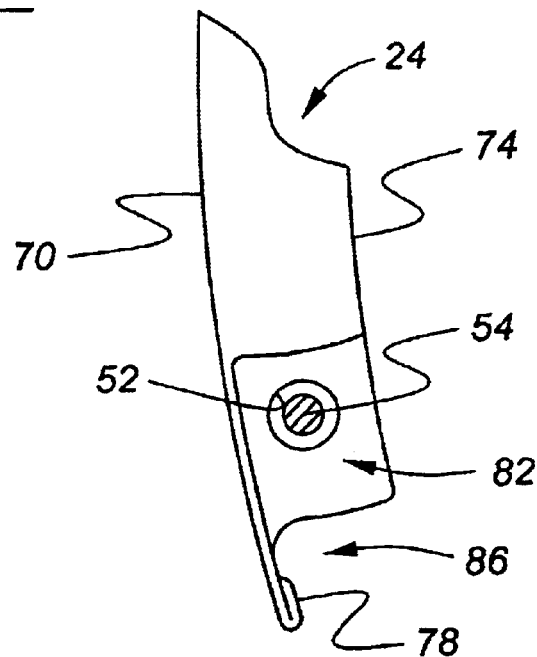
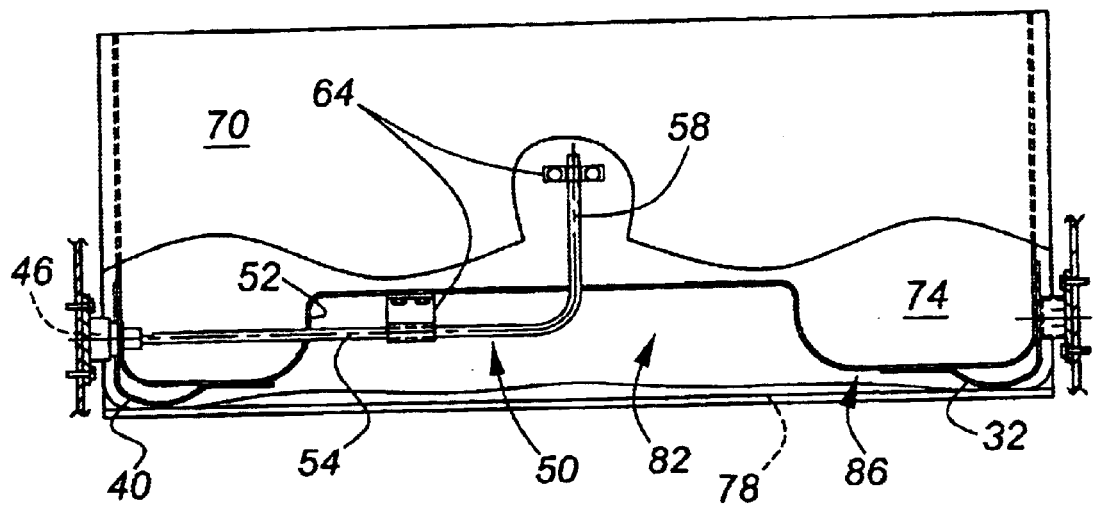
Figure 4

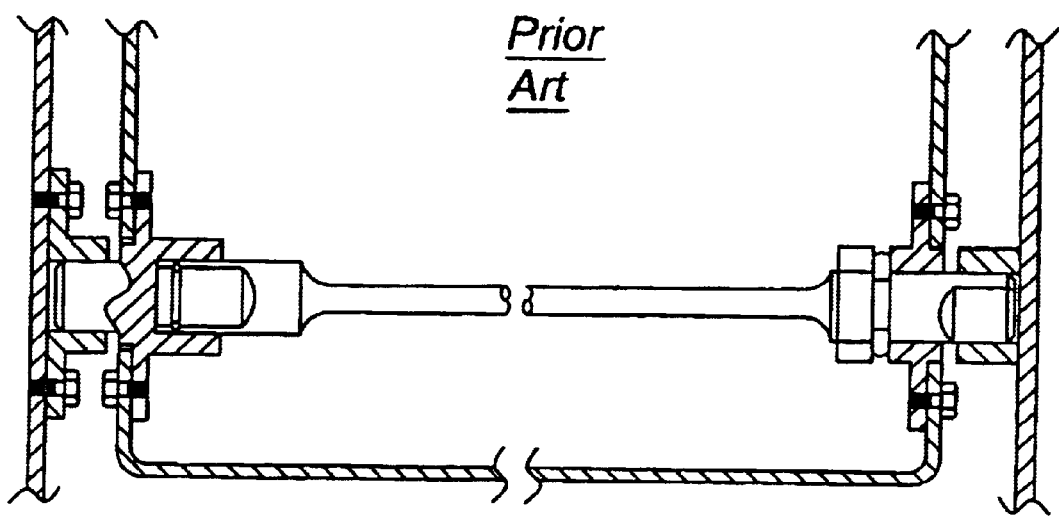
Figure 10 — Prior Art

LIFT ASSISTED TAILGATE SYSTEM FOR AUTOMOTIVE VEHICLE

BACKGROUND OF INVENTION

This Application is a continuation-in-part of U.S. patent application Ser. No. 10/604,331, filed Jul. 11, 2003, now U.S. Pat. No. 6,793,623 entitled "Pickup Truck With Lift Assisted Tailgate System", which is a continuation in part of 10/604,075, filed Jun. 25, 2003, now U.S. Pat. No. 6,769,729 entitled "Automotive Tailgate with Lift Assist System-I".

FIELD OF THE INVENTION

The present invention relates to a vehicle, such as a pickup truck or sport utility vehicle, having a torsion bar for assisting the closure of a tailgate or other door or closure panel mounted for rotation about a generally horizontal pivot axis.

DISCLOSURE INFORMATION

Tailgates used with large pickup trucks and sport utility vehicles present a challenge to the motorist insofar as the weight of such tailgates and the height of such vehicles frequently results in the necessity of expending considerable effort to close the tailgate. U.S. Pat. No. 5,358,301, which is illustrated in FIG. 10, discloses a torsion bar system for assisting the closure of a tailgate. Unfortunately, the system disclosed in the '301 patent suffers from several drawbacks. First, the system would have high cost because the torsion bar is itself used as a hinge pin and this necessitates that the torsion bar be sufficiently large to not only function in torsion, but also in shear, so as to support the tailgate itself. Secondly, the fact that the torsion bar functions not only as a torsion element but also as a pivot for tailgate means that in the event that the torsion bar breaks, the tailgate's pivot function may be impaired, with the result that the tailgate could separate from the vehicle in a unwanted manner.

A torsion bar tailgate lift assist system according to the present invention solves the problems inherent in the previously described system, but at a lower cost, while providing a torsion bar which is full floating. As used herein, the term "full floating" means that if the torsion bar of the present inventive system were to break, the pivoting function and retention of the tailgate to the body of the pickup truck would not be adversely affected unless and until the tailgate is removed by the vehicle's operator, because the tailgate pivots will function perfectly well without any intervention by the torsion bar.

SUMMARY OF INVENTION

According to the present invention, an automotive vehicle includes a cargo box, with roadwheels located under said cargo box, and a closure panel for the cargo box, with the closure panel including a door adapted to pivot about a generally horizontal pivot axis, with the door having a shell defining an interior space, and a hinge half attached to a first end of said door shell. A first pivot post is rigidly attached to a structure of the cargo box and operatively engaged with the hinge half.

A hinge bearing retainer is attached to a second end of the door and has a bearing insert housed therein. A second pivot post is rigidly attached to a corner structure of the cargo box, with the second pivot post engaging the bearing insert such that the second pivot post and the bearing insert are rotationally locked.

A full floating torsion bar assists in closing the door. The torsion bar includes a first end rotationally grounded to the shell of said door and a second end engaged with and rotationally locked with the bearing insert such that said torsion bar will be subjected to torsional loading as the door is pivoted. The torsion bar also includes a torsional reaction section between its first and second ends, with at least a portion of the torsional reaction section extending outside an interior space of the door defined by outer and inner panels.

According to another aspect of the present invention, the door's shell includes an outer panel joined with and spaced from an inner panel, with the inner panel defining an external recess at a lower portion of the door, and with the torsional reaction section of the torsion bar extending outside the shell along at least a portion of the external recess. The external recess may extend across the entire lateral width of said door, or for only a portion of the door's lateral extent. In a preferred embodiment, the external recess has at least one raised section and at least one lowered section, with the torsional reaction section of the torsion bar extending not only outside the shell along at least a portion of the external recess, but also through an internal portion of the shell extending above the lowered section or sections.

According to another aspect of the present invention, the first, or proximate, end of the torsion bar may extend into and be rotationally grounded within an internal portion of the door's shell extending above a lowered section. Alternatively, the first end of the torsion bar may be rotationally grounded to an external portion of the shell. In either case, the first end of the torsion bar may be grounded to the door's shell by a mounting structure secured to the first hinge half.

According to another aspect of the present invention, a method for providing a mechanically assisted door for the body of an automotive vehicle, includes the step of fabricating a door shell from an outer panel joined with and spaced from an inner panel, with the inner panel defining an external recess at a hinge portion of said door. A hinge half is attached to a first end of the door shell, with the hinge half engaging a first pivot post rigidly attached to the vehicle's body. A hinge bearing retainer is provided on a second end of the door and has a bearing insert housed therein, with the bearing insert engaging a second pivot post rigidly attached to the vehicle's body such that the bearing insert is rotationally locked with respect to said body. A full floating torsion bar is provided, with the bar having first and second ends and a portion between the first and second ends which extends along the external recess. The torsion bar may also extend through an internal portion of the shell adjacent to the external recess.

It is an advantage of the present invention that a vehicle tailgate may be provided with a lift assist system having less weight than other known lift assist systems.

It is a further advantage of the present invention that the present lift assist system is less costly than known lift assist systems.

It is a further advantage of the present invention that the present lift assist system permits the construction of a vehicular tailgate offering both removability and lift assist.

It Is a further advantage of the present door system that the torsion bar is full floating. This means that even if torsion bar 50 were to break, bearing insert 42 will not become disengaged from hinge bearing retainer 38 and second pivot post 46, provided the vehicle operator does not remove the tailgate. This full-floating feature means that the pivoting function of the door system and, for that matter, the retention of door 24 upon vehicle 10, will not be adversely affected by breakage of torsion bar 50. And, this is true even if the tailgate is loaded to its maximum capacity. If the torsion bar were to break, the tailgate could nevertheless be removed by the vehicle operator, so as to facilitate repair of the torsion bar.

It is a further advantage of the present invention that the torsion bar employed in the inventive lift assist system may be readily changed in diameter, or in length, or both, so as to alter the effective spring rate of the torsion bar, without the necessity of retooling the tailgate hardware. This change is not easily accommodated by prior art designs.

It is a further advantage that the present torsion bar assist system may be used with tailgates having shells extending either at a full depth for the entire tailgate, or for less than the full depth for a portion of the vertical dimension of the tailgate.

Other advantages, as well as objects and features of the present invention, will become apparent to the reader of this specification.

BRIEF DESCRIPTION OF DRAWINGS

FIG. 3 is a sectional view of the tailgate of FIG. 2, taken along the line 3—3 of FIG. 2.

FIG. 4 is a cut-away plan view of a tailgate similar to that shown in FIG. 2, but representing another embodiment of the present invention.

FIG. 10 illustrates a prior art tailgate assist system.

DETAILED DESCRIPTION

Figure 1:
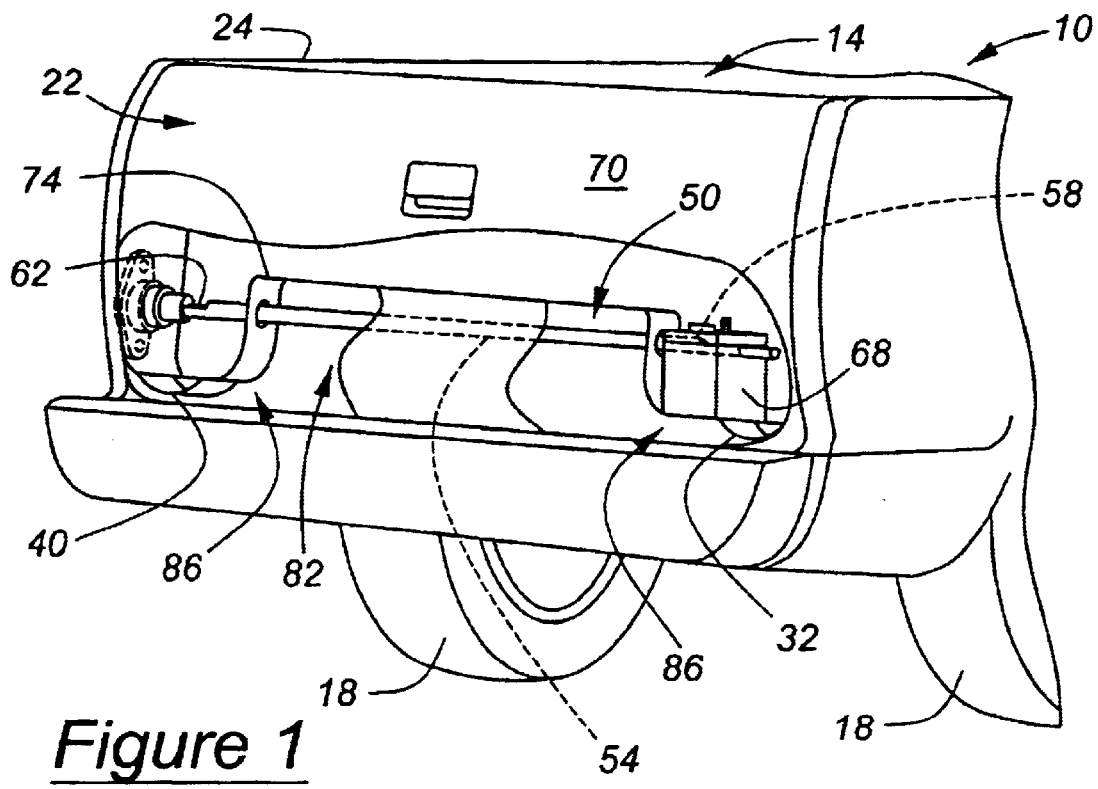
FIG. 1 is a perspective view of a pickup truck having a tailgate lift assist system according to the present invention.

As shown in FIG. 1, vehicle 10, which is exemplified as a pickup truck having a box 14, has rear roadwheels 18, and tailgate closure panel 22 including door 24 and torsion bar 50. Note that torsion bar 50 does not extend across the entire width of tailgate 14. This means that the length of torsion bar 50 may be easily changed, so as to change the effective spring rate of torsion bar 50 to compensate for changes in the weight of door 24.

Viewed together, FIGS. 1, 3, 4, and 6 illustrate several salient features of the present invention. Outer panel 70 and inner panel 74 are formed such that an external recess is provided at a lower portion of door or tailgate 24. Accordingly, raised section 82 of the external recess extends across the central part of door 24, and lowered sections 86 of the external recess extend at both ends of door 24. The central portion, 54, of torsion bar 50 passes through one or more ports 52 (FIG. 3) into the interior of the shell of door 24 as defined by lowered sections 86.

Figure 6:
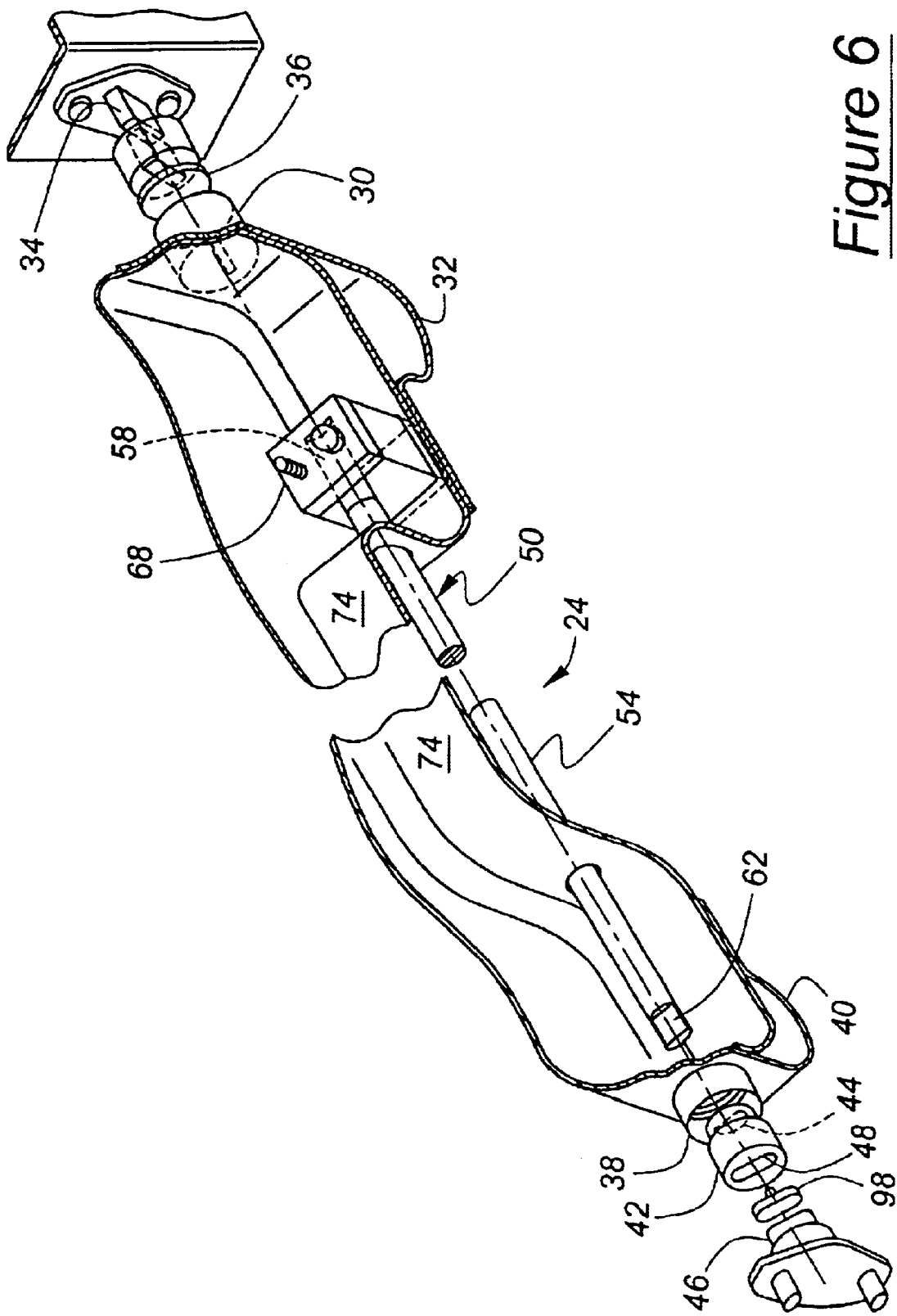
FIG. 6 is a cut-away perspective view of a portion of the tailgate shown in FIGS. 1 and 2.

Torsion bar 50 has a first, or proximate, end 58, which is rotationally grounded to the shell of door 24, inasmuch as pinch block 68, which is attached to right side hinge bracket 32, and which is in turn welded to inner panel 74, captures first, or proximate, end 58. Pinch block 68 may be formed integrally from hinge bracket 32, or could be mechanically joined to bracket 32. Second end 62 of torsion bar 50 is engaged with and rotationally locked with socket 44 formed in bearing insert 42 (FIG. 6). Torsion bar 50 has a torsional reaction section, 54, which extends between ends 58 and 62. As seen in the various figures, torsional reaction section 54 extends through raised section 82 of the external recess.

Figure 7:
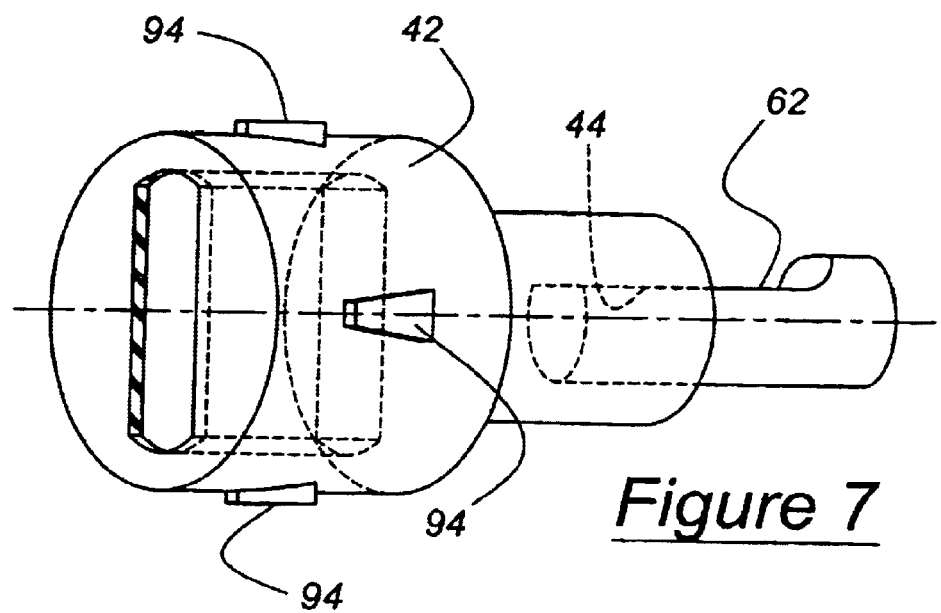
FIG. 7 is shows a bearing insert having an anti-vibration feature.

FIG. 6 shows further that bearing insert 42 is received within hinge bearing retainer 38, which is attached to left hinge bracket 40. As shown in FIG. 7, bearing insert 42 is preferably formed as a generally cylindrical hollow body having a plurality of anti-vibration lands 94 projecting therefrom. Each of lands 94 may be a wedge, or other similarly shaped, projection extending radially from the outer cylindrical surface of bearing insert 42. Lands 94 securely abut the inner cylindrical wall of hinge bearing retainer 38, so as to prevent noise-producing vibrational movement of bearing insert 42.

Figure 5:
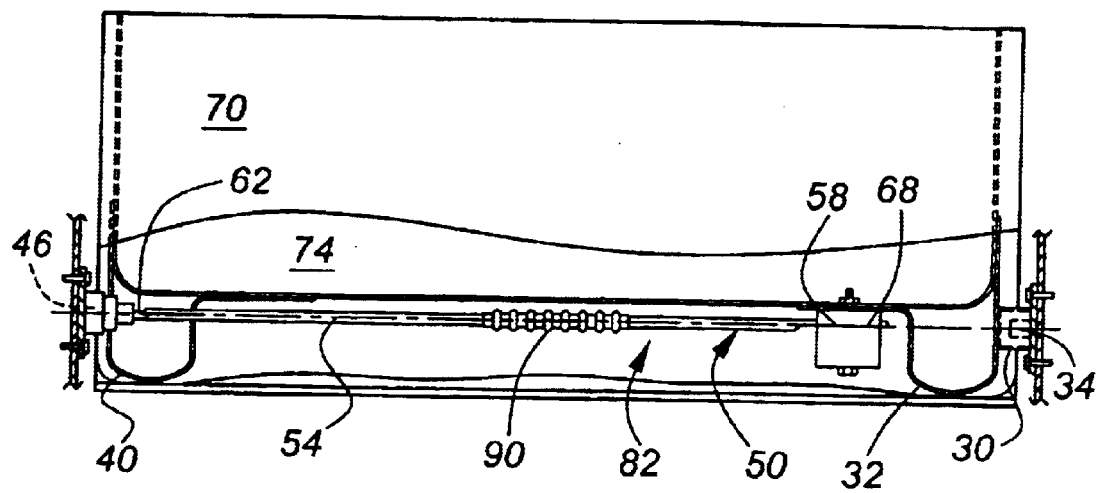
FIG. 5 is a cut-away plan view of a tailgate similar to those shown in FIGS. 2 and 4, but representing another embodiment of the present invention.

Unwanted vibrational movement of torsion bar 50 is addressed by isolator 90 (FIG. 5). Isolator 90 is configured as a generally cylindrical resilient sleeve of elastomer or plastics, having a plurality of generally annular ribs extending radially outwardly from a generally cylindrical outer surface of the sleeve. Isolator 90 may be slidingly engaged with torsional reaction section 54 so that in the event that torsion bar 50 is displaced excessively by road load inputs, the annular ribs will contact door 24, thereby preventing a hard metallic impact between torsion bar 50 and door 24. Isolator 90 may be installed upon torsion bar 50 by means of an overmolding process, or may be fastened by means of adhesives, or by other processes known to those skilled in the art and suggested by this disclosure.

Figure 8:
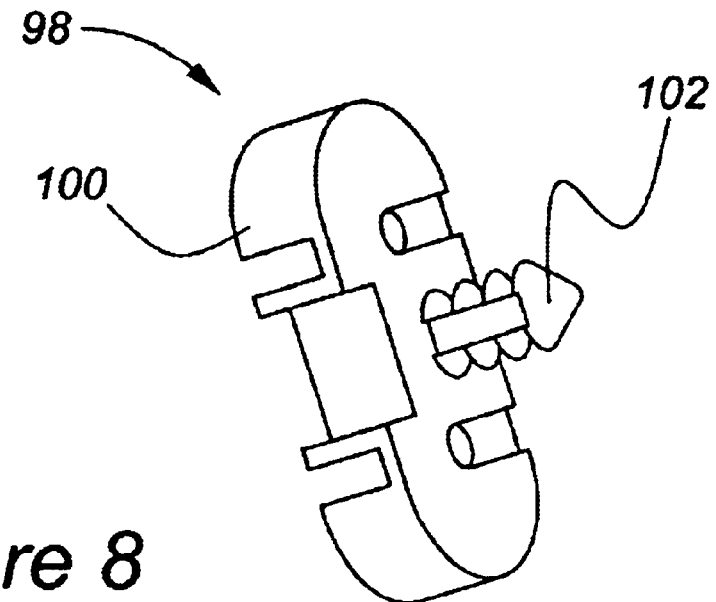
FIGS. 8 and 9 illustrate an integral alignment member useful with a door according to the present invention.
Figure 9:
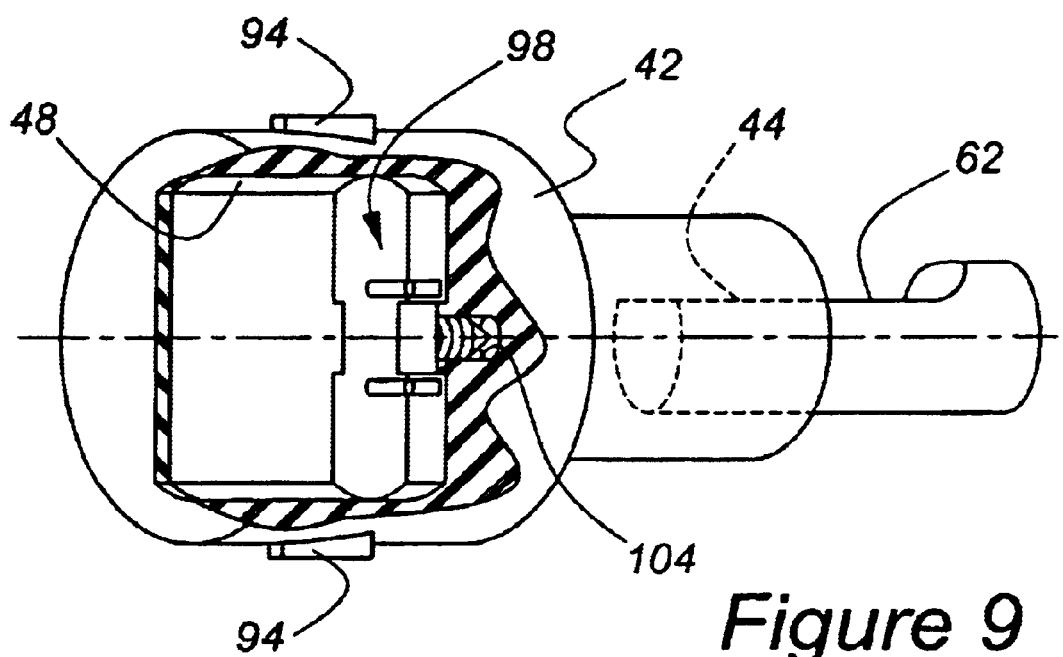

FIGS. 8 and 9 illustrate an alignment member which is useful for applying a closure panel according to the present invention. As shown in FIG. 8, alignment member 98 has a flattened body, 100, having integral barbed retainer 102. As shown in FIG. 9, alignment member 98 is sized to fit slidingly into non-circular bore 48 formed in bearing insert 42. When in place, member 98 abuttingly engages the inboard end of second pivot post 46 (FIG. 6), which is adapted for rigid attachment to a corner structure of cargo box 14. This abutting engagement limits the movement of door 24 toward both second pivot post 46 and the body structure to which it is attached. Advantageously, alignment member 98 is captured between bearing insert 42 and second pivot post 46. At the opposite end of door 24, hinge half 30, which is attached to the shell of door 24 by means of right side hinge bracket 32, slidingly and abuttingly engages first pivot post 34, so as to limit movement of door 24 in the direction of first pivot post 34. One or more circular, flat, spacers shown as element 36 of FIG. 6, may be placed between hinge half 30 and first pivot post 34.

Figure 2:
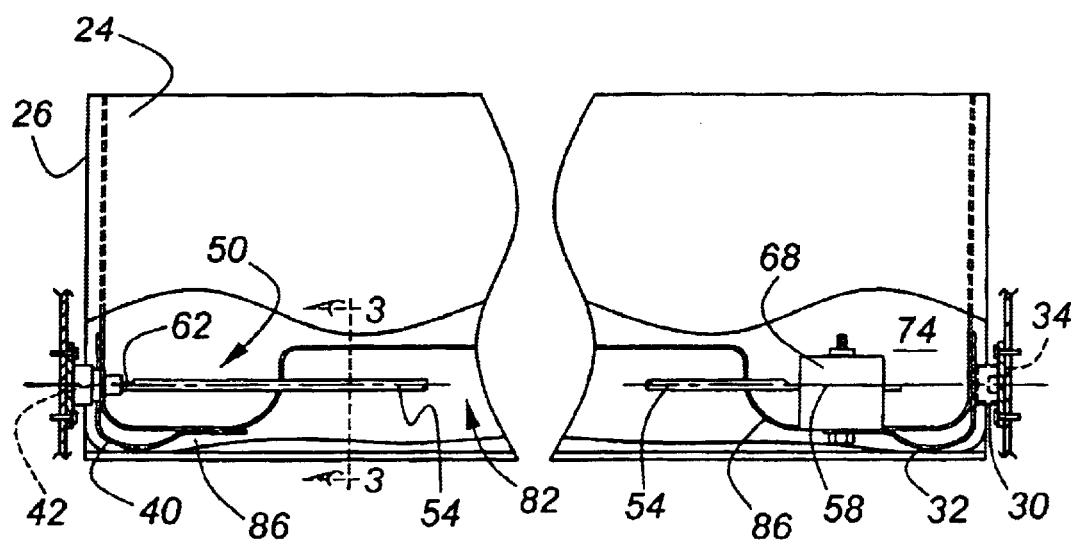
FIG. 2 is a cut-away plan view of a tailgate as shown in FIG. 1.

In the embodiment of FIG. 2, middle portion 54 of torsion bar 50 extends both outside of the shell of door 24 and inside the shell in the regions of lowered sections 86. In contrast, the external recess of door 24 which is illustrated in FIG. 5 extends across the entire lateral width of the door, and no portion of torsion bar 50 extends within the interior of the door's shell.

In the embodiment of FIG. 4, crank arm 58 of torsion bar 50 is grounded within the interior space of door 24 by means of clamps 64. This configuration may offer a packaging advantage with certain doors, or possibly a cost reduction with other types of doors. Clamps 64 may attach torsion bar 50 to the interior space of door 24 by means of attachment to inner reinforcements (not shown) of the type known to those skilled in the art and suggested by this disclosure. Alternatively, the clamps may be attached to the door's shell.

The torsion bar tailgate lift assist system of the present invention provides the benefit of implementing a lift assist function in a removeable tailgate, while in normal operational mode on a vehicle, the present invention provides lift assistance from a fully open tailgate position up to the approximately closed position of the tailgate. Additionally, the torsion bar tailgate lift assist system of the present invention provides lift assistance in the installation of the tailgate. The tailgate using the lift assist system of the present invention, is preferably but not necessarily, installed into the vehicle at an angle in the approximate range of 35 degrees to 50 degrees, as measured in degrees of rotation from the fully closed position, wherein bearing insert 42 is first engaged with second pivot post 46 and the tailgate is then rotated to an angular position in the range of 35 to 50 degrees in order to assemble hinge half 30 onto first pivot post 34. The rotation of the tailgate in the installation process causes an initial torsional reaction in torsion bar 50. This initial torsional reaction is operational to provide assistance in closing the tailgate upon installation from the installation position angle of approximately 35 to 50 degrees up to closed tailgate position or a proximately closed tailgate position.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An automotive vehicle comprising:
   a cargo box;
   a plurality of roadwheels located under said cargo box;
   a closure panel for said cargo box, with said closure panel comprising:
   a door adapted to pivot about a generally horizontal pivot axis, with said door having a shell defining an interior space;
   a hinge half attached to a first end of said door shell;
   a first pivot post rigidly attached to a structure of said cargo box and operatively engaged with said hinge half;
   a hinge bearing retainer attached to a second end of said door and having a bearing insert housed therein;
   a second pivot post rigidly attached to a structure of said cargo box, with said second pivot post engaging said bearing insert such that said second pivot post and said bearing insert are rotationally locked; and
   a full floating torsion bar comprising:
   a first end rotationally grounded to said shell of said door;
   a second end engaged with and rotationally locked with said bearing insert such that said torsion bar will be subjected to torsional loading as said door is pivoted; and
   a torsional reaction section mediate said first end and said second end, with at least a portion of said torsional reaction section extending outside the interior space of said door.

2. An automotive vehicle according to claim 1, wherein said shell of said door comprises an outer panel joined with and spaced from an inner panel, with said inner panel defining an external recess at a lower portion of said door, and with said torsional reaction section of said torsion bar extending outside said shell along at least a portion of said external recess.

3. An automotive vehicle according to claim 2, wherein said external recess extends across the entire lateral width of said door.

4. An automotive vehicle according to claim 2, wherein the entirety of said torsional reaction section of said torsion bar extends outside said shell and along at least a portion of said external recess.

5. An automotive vehicle according to claim 4, wherein said torsional reaction section of said torsion bar extends through a hinge bracket interposed between said shell and said hinge bearing retainer.

6. An automotive vehicle according to claim 2, wherein said first end of said torsion bar is rotationally grounded to an external portion of said shell.

7. An automotive vehicle according to claim 3, wherein said external recess has at least one raised section and at least one lowered section, with said torsional reaction section of said torsion bar extending not only outside said shell along at least a portion of said external recess, but also through an internal portion of said shell extending above said at least one lowered section.

8. An automotive vehicle according to claim 7, wherein said first end of said torsion bar extends into and is rotationally grounded within an internal portion of said shell extending above one of said at least one lowered section.

9. An automotive vehicle according to claim 7, wherein said first end of said torsion bar is rotationally grounded to an external portion of said shell.

10. An automotive vehicle according to claim 1, wherein said first end of said torsion bar comprises a crank arm extending into said interior space of said shell.

11. An automotive vehicle according to claim 10, wherein said crank arm is secured by a clamp mounted within the interior space of said shell.

12. An automotive vehicle according to claim 1, wherein said first end of said torsion bar is rotationally grounded to said shell of said door by a mounting structure secured to said first hinge half.

13. An automotive vehicle according to claim 1, wherein said mounting structure secured to said first hinge half comprises a pinch block attached to a hinge bracket incorporated in said hinge half.

14. An automotive vehicle according to claim 1, wherein said mounting structure secured to said first hinge half comprises a pinch block formed integrally from a hinge bracket incorporated in said hinge half.

15. An automotive vehicle according to claim 1, wherein said second pivot post slidingly engages a mating non-circular bore formed in said bearing insert.

16. An automotive vehicle comprising:
   a vehicle body;
   a plurality of roadwheels located under said vehicle body;
   a closure panel for said body, with said closure panel comprising:
   a door adapted to pivot about a generally horizontal pivot axis, with said door having a shell comprised of an outer panel joined with and spaced from an inner panel, with said inner panel defining an external recess at a lower portion of said door;
   a hinge half attached to a first end of said door shell;
   a first pivot post rigidly attached to said body and operatively engaged with said hinge half;

a hinge bearing retainer attached to a second end of said door and having a bearing insert housed therein;

a second pivot post rigidly attached to said body, with said second pivot post engaging said bearing insert such that said second pivot post and said bearing insert are rotationally locked; and a full floating torsion bar comprising:

a first end rotationally grounded to said shell of said door;

a second end engaged with and rotationally locked with said bearing insert such that said torsion bar will be subjected to torsional loading as said door is pivoted; and a torsional reaction section mediate said first end and said second end, with at least a portion of said torsional reaction section extending along said external recess.

17. An automotive vehicle according to claim 16, wherein said external recess has at least one raised section and at least one lowered section, with said torsional reaction section of said torsion bar extending not only outside said shell along at least a portion of said external recess, but also through an internal portion of said shell extending above said at least one lowered section.

18. An automotive vehicle according to claim 16 wherein said first end of said torsion bar comprises a crank arm extending into an interior space of said shell defined by said outer panel and said inner panel.

19. A method for providing a mechanically assisted door for the body of an automotive vehicle, comprising the steps of:

fabricating a door shell comprised of an outer panel joined with and spaced from an inner panel, with said inner panel defining an external recess at a hinge portion of said door;

providing a hinge half attached to a first end of said door shell, with said hinge half engaging a first pivot post rigidly attached to said body;

providing a hinge bearing retainer attached to a second end of said door and having a bearing insert housed therein, with said bearing insert engaging a second pivot post rigidly attached to said body such that said bearing insert is rotationally locked with respect to said body; and providing a full floating torsion bar comprising:

a first end rotationally grounded to said door;

a second end engaged with and rotationally locked with said bearing insert such that said torsion bar will be subjected to torsional loading as said door is pivoted; and a torsional reaction section mediate said first end and said second end, with at least a portion of said torsional reaction section extending along said external recess.

20. A method according to claim 19, wherein a portion of said torsion bar extends through an internal portion of said shell adjacent to said external recess.

21. A closure panel for an automotive vehicle body having a first pivot post and a second pivot post on the automotive vehicle body, the closure panel comprising:

a door adapted to pivot about a generally horizontal pivot axis, with said door having a shell defining an interior space;

a hinge half attached to a first end of said door shell and adapted to be operationally engaged with the first pivot post;

a hinge bearing retainer attached to a second end of said door and having a bearing insert housed therein, the hinge bearing insert being adapted to be rotationally locked to the second pivot post; and a torsion bar comprising:

a first end rotationally grounded to said shell of said door;

a second end engaged with and rotationally locked with said bearing insert such that said torsion bar will be subjected to torsional loading as said door is pivoted; and a torsional reaction section mediate said first end and said second end, with at least a portion of said torsional reaction section extending outside the interior space of said door.

22. A closure panel for an automotive vehicle body according to claim 21, wherein said bearing insert comprises a plurality of anti-vibration lands projecting from a generally cylindrical hollow body.

* * * * *